US007702551B2

United States Patent
Carver

(10) Patent No.: US 7,702,551 B2
(45) Date of Patent: Apr. 20, 2010

(54) METHOD AND SYSTEM FOR COPYING EQUITY AND DEBT FINANCING TERMS, FROM ONE OF A VARIETY OF SECURITIES, SELECTIVELY AND OR AGGREGATELY, IN A QUANTITATIVE MANNER THAT ENABLES RAPID VISUALIZING, COMPARING AND VIEWING OF THE FINANCIAL IMPACT OF COPIED TERMS IN HYPOTHETICAL OR ACTUAL LIQUIDATION, PUBLIC OFFERING, FINANCING OR OTHER SCENARIOS

(76) Inventor: Lorenzo Carlton Carver, 4450 Arapahoe, Suite 100, Boulder, CO (US) 80303

( * ) Notice: Subject to any disclaimer, the term of this patent is extended or adjusted under 35 U.S.C. 154(b) by 113 days.

(21) Appl. No.: 11/853,008

(22) Filed: Sep. 10, 2007

(65) Prior Publication Data

US 2008/0065563 A1 Mar. 13, 2008

Related U.S. Application Data

(60) Provisional application No. 60/825,202, filed on Sep. 11, 2006.

(51) Int. Cl.
*G06F 17/40* (2006.01)
(52) U.S. Cl. .............................. 705/35; 705/37; 705/38
(58) Field of Classification Search ............... 705/1–80; 707/10; 463/42
See application file for complete search history.

(56) References Cited

U.S. PATENT DOCUMENTS 5,884,323 A * 3/1999 Hawkins et al. ............. 707/201
2005/0256790 A1* 11/2005 Hogan ......................... 705/35

OTHER PUBLICATIONS

Robert C. Rathbone, Understanding Cooperatives: Financing Cooperatives, Jan. 1995 Reprinted Jan. 1999, web edition, pp. 1-4.*

* cited by examiner

*Primary Examiner*—James P Trammell
*Assistant Examiner*—Marissa Liu

(57) ABSTRACT

A method and system enables copying of equity and debt financing terms, from one of a variety of securities, selectively and or aggregately, in a manner that enables rapid visualizing, comparing and viewing of the financial impact of copied terms in a hypothetical or actual liquidation, public offering, financing or other financial scenarios.

4 Claims, 11 Drawing Sheets

|  | A | B | C | D | E | F | G | H | I | J | K |
|---|---|---|---|---|---|---|---|---|---|---|---|
| 5 |  |  |  | Series A |  | Series B |  |  |  | Options |  |  |
| 6 | Investor | Founders | Series A | Warrants | Series B | Warrants | Series C | Series D | Outstanding | Total | % |
| 7 | Brian Denehy | 562,500 | 1,450,000 | - | - | - | - | - | - | 2,012,500 | 6.1066% |
| 8 | Thomas Jefferson | 562,500 | 300,000 | - | - | - | - | - | - | 862,500 | 2.62% |
| 9 | Pacsal Remington | 562,500 | 150,000 | - | - | - | - | - | - | 712,500 | 2.16% |
| 10 | Brad Schmitt | 562,500 | - | - | - | - | - | - | - | 562,500 | 1.71% |
| 11 | Jeffrey Rush | - | 200,000 | - | - | - | - | - | - | 200,000 | 0.61% |
| 12 | Rubin Studdard | - | 150,000 | - | - | - | - | - | - | 150,000 | 0.46% |
| 13 | Michael Kingsley | - | 100,000 | - | - | - | - | - | - | 100,000 | 0.30% |
| 14 | Stanley Steamer | - | 100,000 | - | - | - | - | - | - | 100,000 | 0.30% |
| 15 | Deepak Churpa | - | 150,000 | - | - | - | - | - | - | 150,000 | 0.46% |
| 16 | Douglas McCarther | - | 150,000 | - | - | - | - | - | - | 150,000 | 0.46% |
| 17 | Robert Kenedy | - | 100,000 | - | - | - | - | - | - | 100,000 | 0.30% |
| 18 | J. Dennis Rodman | - | 100,000 | - | - | - | - | - | - | 100,000 | 0.30% |
| 19 | John Travolta | - | 50,000 | - | - | - | - | - | - | 50,000 | 0.15% |
| 20 | Accerated | - | - | - | 3,250,000 | - | 1,406,250 | 500,000 | - | 5,156,250 | 15.65% |
| 21 | Oakley | - | - | - | 3,250,000 | - | 1,406,250 | 500,000 | - | 5,156,250 | 15.65% |
| 22 | Venture Capabilities | - | - | - | 750,000 | - | 1,875,000 | 300,000 | - | 2,925,000 | 8.88% |
| 23 | Steve Rocko | - | - | - | 100,000 | - | - | - | - | 100,000 | 0.30% |
| 24 | Steffan Edingburl | - | - | - | 20,000 | - | - | - | - | 20,000 | 0.06% |
| 25 | SOS | - | - | - | 250,000 | - | - | - | - | 250,000 | 0.76% |
| 26 | HP Compaq Partners | - | - | - | - | - | 843,750 | 165,000 | - | 1,008,750 | 3.06% |
| 27 | Blacksheep Partners | - | - | - | - | - | 312,500 | 200,000 | - | 512,500 | 1.56% |
| 28 | GoDisco Inc. | - | - | 1,039,394 | - | - | 156,250 | 35,000 | - | 1,230,634 | 3.73% |
| 29 | Headwind Capital Partners, L. | - | - | - | - | - | 78,126 | 50,000 | - | 128,126 | 0.39% |
| 30 | Peter Aw Boon Haw | - | - | - | - | - | 78,126 | - | - | 78,126 | 0.24% |
| 31 | Ending Point Investments, LL | - | - | - | - | - | 78,126 | - | - | 78,126 | 0.24% |
| 32 | SyQuest Technology, LLC | - | - | - | - | - | 15,626 | - | - | 15,626 | 0.05% |
| 33 | Merry Maid Technologies | - | - | - | - | - | - | 1,750,000 | - | 1,750,000 | 5.31% |
| 34 | InterestCo | - | - | - | - | - | - | 800,000 | - | 800,000 | 2.43% |
| 35 | Barbie Capital | - | - | - | - | - | - | 800,000 | - | 800,000 | 2.43% |
| 36 | Stapples | - | - | - | - | - | - | 200,000 | - | 200,000 | 0.61% |
| 37 | NOC | - | - | - | - | - | - | 50,000 | - | 50,000 | 0.15% |
| 38 | Sombrero | - | - | - | - | - | - | 50,000 | - | 50,000 | 0.15% |
| 39 | Options Outstanding | - | - | - | - | - | - | - | 4,815,876 | 4,815,876 | 14.61% |
| 40 | Options exercised | - | - | - | - | - | - | - | 3,407,260 | 3,407,260 | 10.34% |
| 41 | Options repurchased | - | - | - | - | - | - | - | (877,536) | (877,536) | -2.66% |
| 42 | Venture Bank Warrants | - | - | - | - | 51,250 | - | - | - | 51,250 | 0.16% |
| 45 | Total | 2,250,000 | 3,000,000 | 1,039,394 | 7,620,000 | 51,250 | 6,250,004 | 5,400,000 | 7,345,600 | 32,956,238 | 100.00% |

Preferred Financing Events – Properties — 1010

Name: Series C

Original Close Date: 9/ 4/2006 — 1011

Amount Raised: $0 — 1012

Tranches? ○ No ○ Yes [Edit Details]

Transaction Pricing (Original)

Dividends — 1020

Rate: 10.00%   [Edit Details]

Cumulative? ○ No ● Yes — 1021

Price Protection/Anti-Dilution — 1025

Type: (WAB) Weighted Av   [Edit Details] — 1026

Exit Preferences — 1040

Liquidation preference multiple: x3.00 — 1050

Is this security participating? ○ No ● Yes — 1060

Participation cap multiple: No Cap — 1070

Seniority (rank): 1st — 1079

[Edit Details] — 1080

Warrant Coverage

Transaction Documents

1.1.1 <u>Adjustment of Series A Conversion Price Upon Issuance of Additional Shares of Common Stock.</u>[1] In the event the Corporation shall at any time after the Series A Original Issue Date issue Additional Shares of Common Stock (including Additional Shares of Common Stock deemed to be issued pursuant to <u>Subsection 4.4.3</u>), without consideration or for a consideration per share less than the Series A Conversion Price in effect immediately prior to such issue, then the Series A Conversion Price shall be reduced, concurrently with such issue, to a price (calculated to the nearest [one-hundredth of a cent]) determined in accordance with the following formula:

$$NCP = OCP * ((A + B) \div (A + C)).$$

For purposes of the foregoing formula, the following definitions shall apply:

(a) "NCP" shall mean the Series A Conversion Price in effect immediately after such issue of Additional Shares of Common Stock (b) "OCP" shall mean the Series A Conversion Price in effect immediately prior to such issue of Additional Shares of Common Stock;

(c) "A" shall mean the number of shares of Common Stock outstanding immediately prior to such issue of Additional Shares of Common Stock (treating for this purpose as outstanding all shares of Common Stock issuable upon exercise of Options outstanding immediately prior to such issue or upon conversion or exchange of Convertible Securities (including the Series A Preferred Stock) outstanding (assuming exercise of any outstanding Options therefor) immediately prior to such issue);

(d) "B" shall mean the number of shares of Common Stock that would have been issued if such Additional Shares of Common Stock had been issued at a price per share equal to OCP (determined by dividing the aggregate consideration received by the Corporation in respect of such issue by OCP), and (e) "C" shall mean the number of such Additional Shares of Common Stock issued in such transaction.

FIG. 11

METHOD AND SYSTEM FOR COPYING EQUITY AND DEBT FINANCING TERMS, FROM ONE OF A VARIETY OF SECURITIES, SELECTIVELY AND OR AGGREGATELY, IN A QUANTITATIVE MANNER THAT ENABLES RAPID VISUALIZING, COMPARING AND VIEWING OF THE FINANCIAL IMPACT OF COPIED TERMS IN HYPOTHETICAL OR ACTUAL LIQUIDATION, PUBLIC OFFERING, FINANCING OR OTHER SCENARIOS

This application claims the benefit of U.S. Provisional Application No. 60/825,202, filed Sep. 11, 2006, which is incorporated hereby by reference.

FIELD OF THE INVENTION

The present invention relates to technology for copying equity and debt financing terms, from one of a variety of existing securities, selectively and or aggregately, to a new proposed or actual security, in a manner that enables rapid visualizing, comparing and viewing of the financial impact of copied terms in a hypothetical or actual liquidation, public offering, financing or other financial scenarios.

BACKGROUND OF THE INVENTION

Alternative and specialty equity and debt financing transactions are generally very complex, as compared to simple transactions that involve, perhaps, fixed rates of return, fixed terms, fixed pricing and, in some cases, relatively established, large and untroubled companies. Alternative and specialty equity and debt financing transactions, such as venture capital and private equity transactions, are a critical component of economic growth in the modern world. These transactions involve a great deal of risk for every party, including, but not limited to, the company founders, management, employees, venture fund partners, individual investors, pension funds and others. A complex array of contractual provisions, or terms, have arisen over time to allow investors in these transactions to mitigate and allocate risk in a manner that marries opportunity with reality to an acceptable degree as to induce a willing and able party to invest in one or more staged financings, or "rounds" offered by a particular early stage company.

An example of the complexity and range of these contractual provisions, or terms, is evidenced in, by not limited to, the National Association of Venture Capitalists' (NVCA) model venture capital financing documents. An indication of the complexity of these transactions is the very size, in terms of words and characters, of these model document, which relate to a single, and early, prospective and actual round of Series A financing. Of the 8 model financing documents displayed on the NVCA's web site, 6 of the documents contain language, rights and terms that would, do or could, impact a number of future or past financing, liquidity or other scenarios, the impact of which can only be illustrated with financial models. These 6 documents, for a single financing transaction, consist of over 67,000 words to convey the rights, making it unlikely that the impact of these requirements can be quantified, in specific terms, simply by reading the documents, even if they are read over and over again by an experienced professional. This complexity, along with the related length and mass of text, means that in many cases a counselor to the company, or other party involved in a prospective or actual financing transaction, will begin the process of drafting transaction documents by copying a textual, or word processing, file used in a previous round of financing or with a prior company the party had worked with or on.

While this process of copying text is beneficial to all parties, with regards to getting the process moving forward, reducing short-term and immediate legal and advisory expenses incurred, and other factors inherent in the urgency of getting deals done, it suffers from requiring an entirely separate process to have the impact of the proposed or actual terms and contractual language quantified. Similarly, without a means to quickly capture the quantifiable aspects of a given term or contractual passage, and allow further editing and relatively copying of those elements, several likely scenarios for understanding and acting on the potential and anticipated financial impacts of the elements exist. None of these alternatives are particularly favorable, or efficient, especially in light of the present invention. One possibility is that a great deal of effort and expense is incurred to get each and every term modeled using prior art resources, such as spreadsheets and or existing limited template or programmatic solutions. Some of these models and solutions may model liquidation scenarios, or facilitate rather rigid, and virtually un-auditable, estimates of anti-dilution provision or liquidation preference impacts. Moreover, each of these solutions will require either an extensive manual input of information or a tedious editing of formulas, formulas that are difficult for parties other than their author to quickly understand, verify and edit.

Another alternative possibility of dealing with the lack of means to quickly capture the quantifiable aspects of a given term or contractual passage, and allow further editing and relatively copying of those elements, is to rely on prior experience and intuition and argue, or allow and not argue, for terms that are perceived in hindsight to be relatively more important or less important. This is, in all likelihood, the most popular route. While it is often less expensive, with regard to immediate cash expended in the form of professional service fees, it is potentially the most costly in industries built on competency and relationships, such as the venture capital and private equity industries. As an example, a party might argue for a full-ratchet anti-dilution provision, even though under any of the party's own anticipated scenarios the likely impact of having such a provision, as opposed to a less severe provision, on their return would be nominal. However, without a means of cost effectively accurately modeling that impact, with limited human input required, a lack of awareness of the chasm between intuition and quantifiable reality exists.

The final possibility, and ideally the least likely approach taken in response to the limited alternatives in the prior art, is to take a position that the financial impact of terms is of little importance since, in the end, the parties have no direct control over when and how a liquidity or subsequent financing event occurs. This, of course is often a self-fulfilling prophecy that no solution can address entirely. However, with the ease enabled by the present invention's ability to copy terms from one deal to another to be modeled quantitatively, the invention could still help in even this case.

In view of the foregoing, there is a strong need for novel systems and methods that can allow a user to copy equity and debt financing terms, from one of a variety of securities, selectively and or aggregately, in a manner that enables rapid visualization, comparison and viewing of the financial impact of copied terms in a hypothetical or actual liquidation, public offering, financing or other financial scenarios.

BRIEF DESCRIPTION OF THE DRAWINGS

FIG. 6 illustrates portions of an exemplary spreadsheet application display, containing a capitalization table with multiple classes of equity securities that may form the basis for source capitalization information that may be used in an embodiment of the invention FIG. 10 is an illustration of a the sample interface from FIG. 8, that displays security terms at a high level, quantitatively, such terms being used to illustrate terms that could be displayed, having been copied from the prior series (round) security in accordance with an embodiment of the present invention FIG. 11 illustrates a table of information from a legal document that contains an anti-dilution formula, in accordance with the prior art, which could be copied and pasted into an interface formula window in accordance with an embodiment of the present invention is an illustration of an interface in accordance with the present invention

DETAILED DESCRIPTION OF PREFERRED EMBODIMENTS

Figure 1:
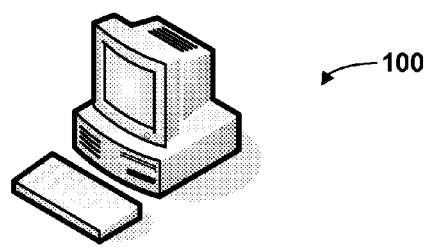
FIG. 1 illustrates an exemplary computer system that may be used to execute the software of an embodiment of the invention
Figure 2:
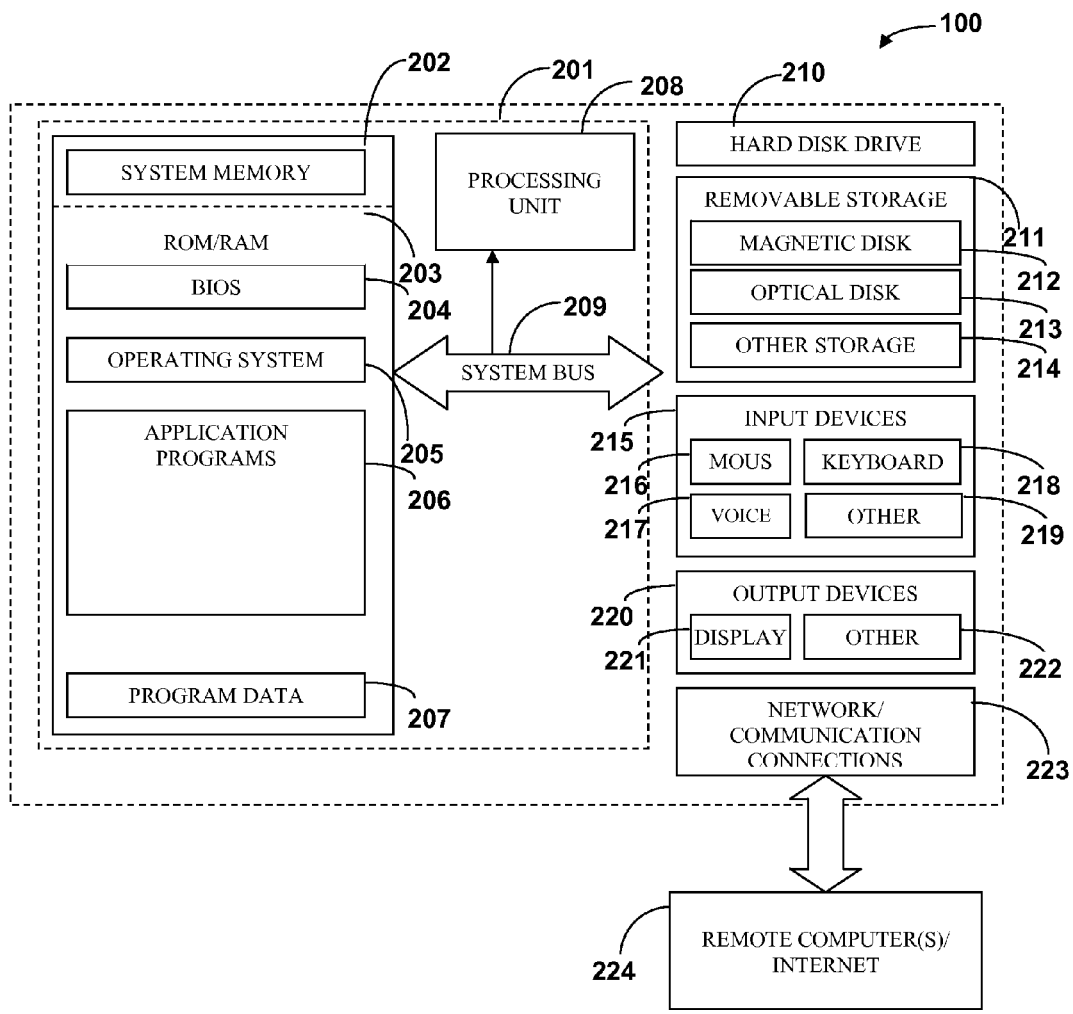
FIG. 2 is a block diagram of the exemplary computer system shown in FIG. 1.
Figure 3:
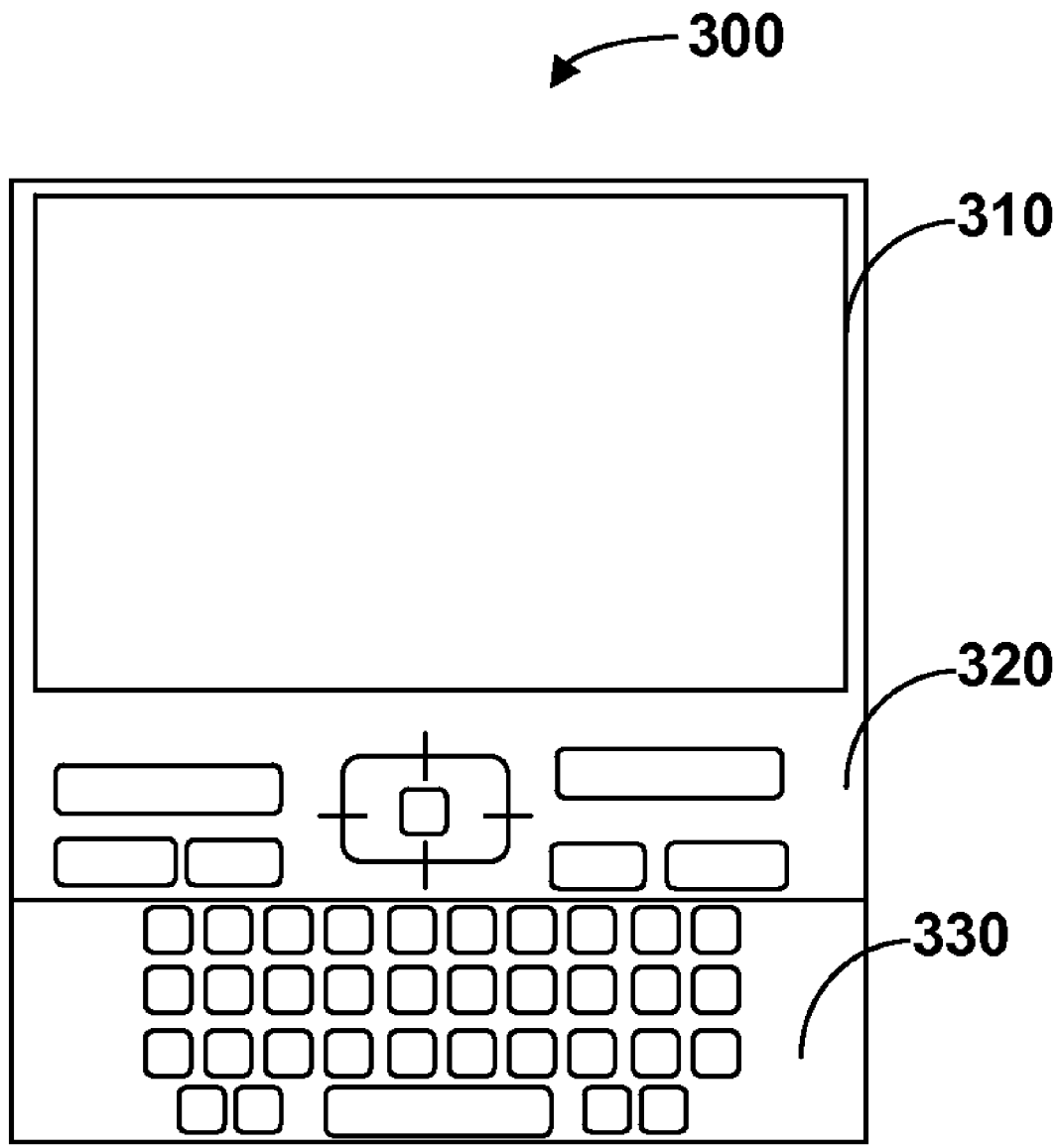
FIG. 3 illustrates an exemplary smart phone computer system screen, manual input keyboard and control buttons that may be used to execute the software of an embodiment of the invention
Figure 4:
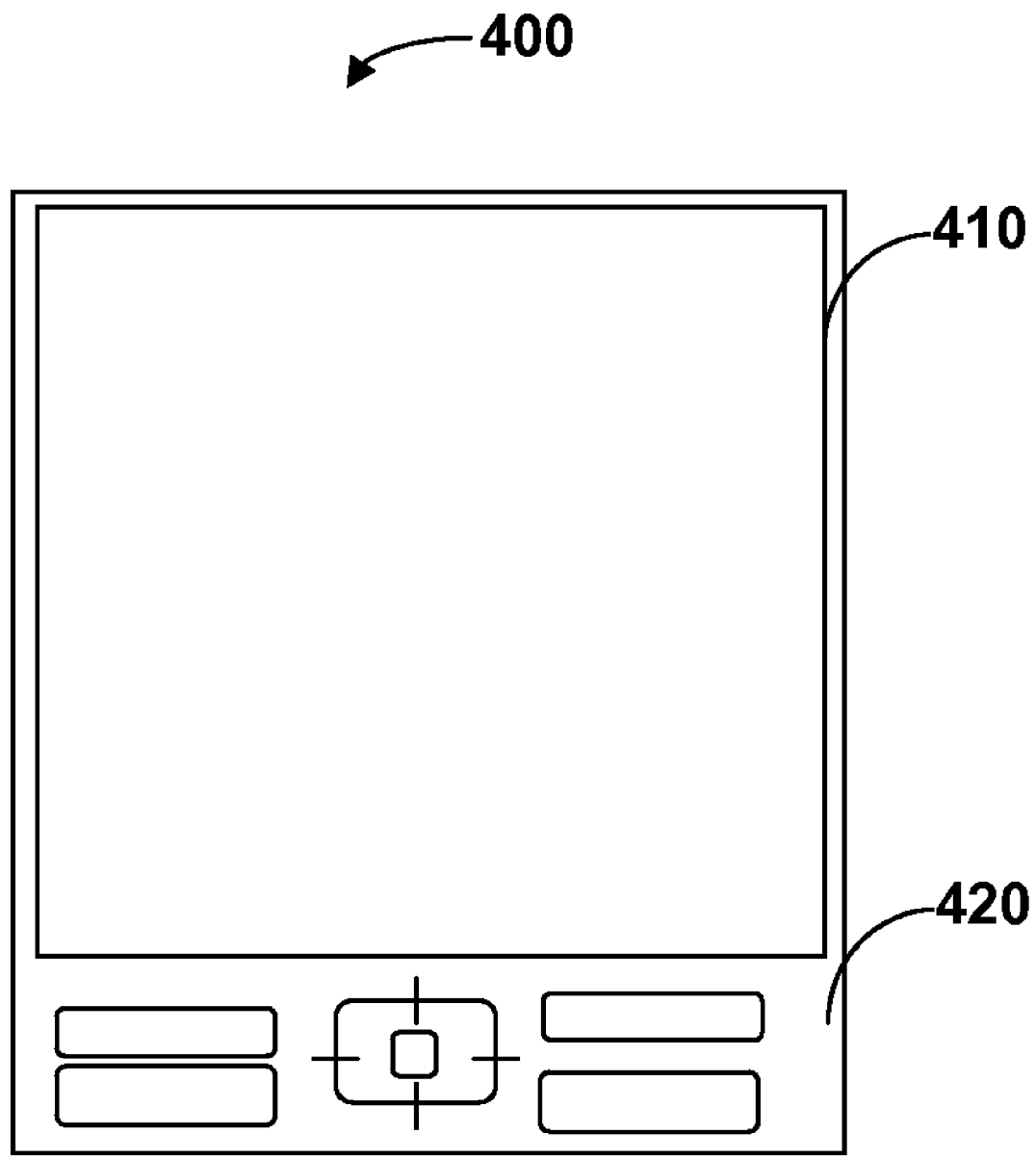
FIG. 4 illustrates an exemplary handheld personal computer, or personal digital assistant, computer system screen, and control buttons that may be used to execute the software of an embodiment of the invention

FIG. 1 illustrates an exemplary computer system 100 that may be used to execute the software of an embodiment of the invention and FIG. 2 shows a block diagram of the exemplary computer system 100 shown in FIG. 2, including; output devices 221, such as, but not limited to, a display 222, and other output devices 223; input devices 216 such as, but not limited to, a mouse 217, a voice input device 218, a keyboard 219 and other input devices 220; removable storage 211 that may be used to store and retrieve software programs incorporating code that aids or executes the invention or stores data for use with the invention, or otherwise interacts with the invention, such as, but not limited to, magnetic disk storage 212, optical storage 213 and other storage 214 that; a hard drive 210 that may be used to store and retrieve software programs incorporating code that aids or executes the invention or stores data for use with the invention, or otherwise interacts with the invention; and typical system components, such as those within dashed line 201, including but not limited to system memory 202, which typically contains BIOS (Basic Input Output System) 204, RAM (Random Access Memory) and ROM (Read Only Memory) 203, an operating system 205, application programs 206, program data 207, a processing unit 208, system bus 209, and network and or communications connections 224 to remote computers and or the Internet 225.

Figure 5:
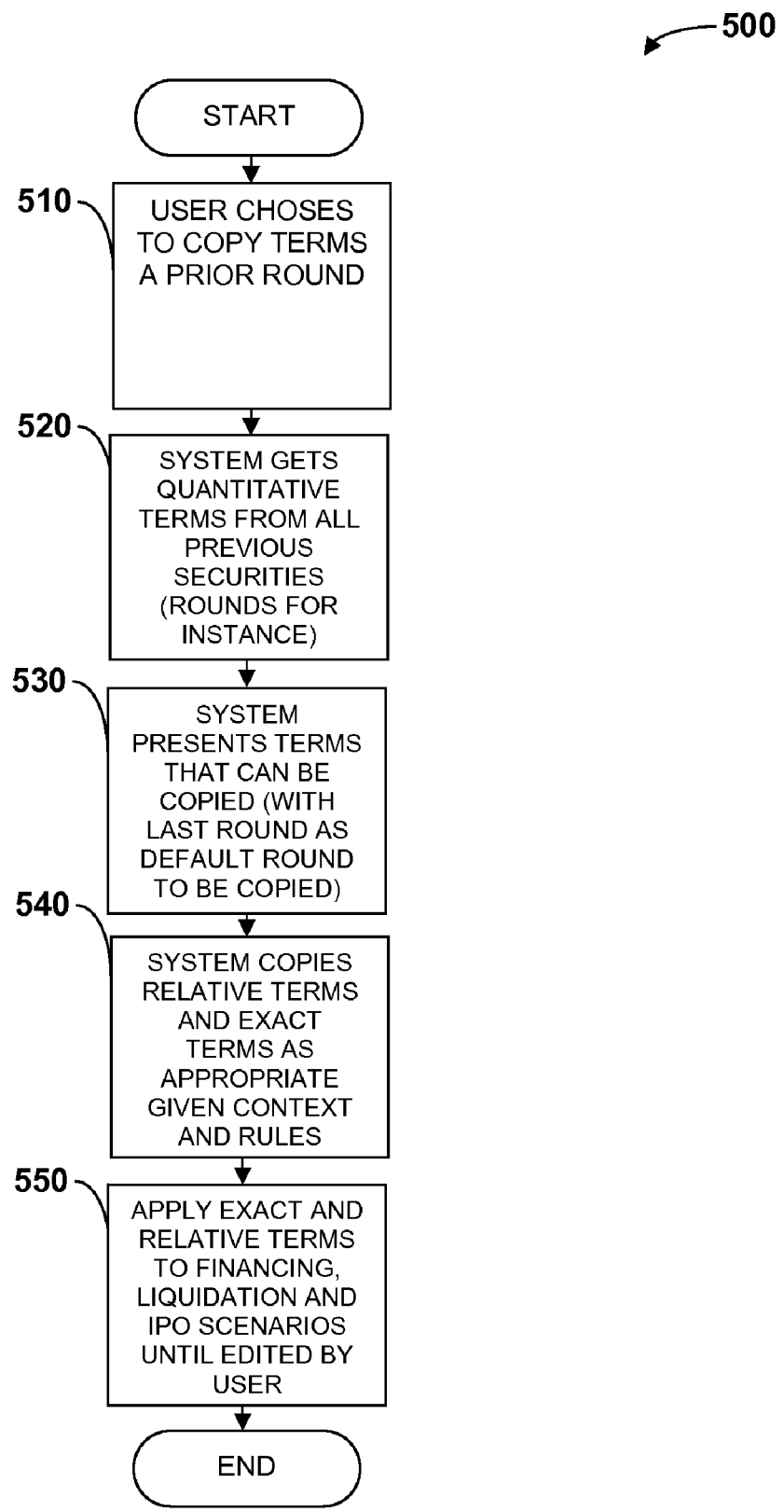
FIG. 5 shows a process flow of copying equity financing terms, from one of a variety of existing securities, selectively and or aggregately, to a new proposed or actual security in accordance with the present invention.

FIG. 5 shows a method and system of copying equity financing terms, from one of a variety of existing securities, selectively and or aggregately, to a new proposed or actual security in accordance with the present invention. In FIG. 5, a user has chosen to copy terms from a prior round (or previous, existing security, or other security in the system) 510. Next, the system accesses quantitative terms from all previous (or other) securities (rounds for instance) 520, in a database or other system storage file. The system then presents a summary version of those terms 530, enabling the user to quickly copy categories of terms, as opposed to having to manually select or specify each nuance of each and every term primer to building an accurate model or actual financial or liquidation transaction which would be the case in the prior art for a single term, much less multiple terms.

Figure 12:
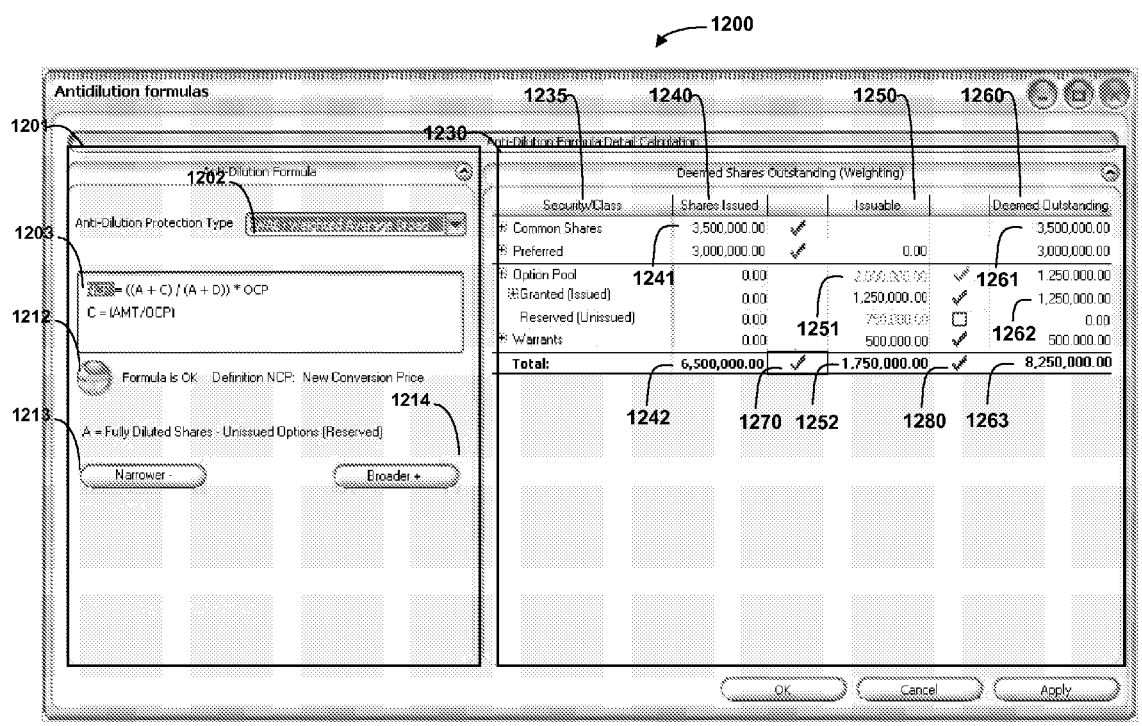
FIG. 12 is an illustration of a sample interface that displays one of the security term categories shown in FIG. 8, in this particular anti-dilution provisions, at a high level, quantitatively, but shown here in this interface at a more detail level, such detail terms being used to illustrate terms that could be displayed and possibly copied in accordance with the present invention

To appreciate the novelty and utility of this functionality, as illustrated in steps 510 through 530 of FIG. 5, a quick review of FIG. 6, portions of a illustrative capitalization table from a company with multiple classes of securities, along with a review of FIG. 11, a table of information from a legal document that contains an anti-dilution formula, in accordance with the prior art, and FIG. 12, a sample interface that displays anti-dilution provisions at a detail level, such detail terms being used to illustrate terms that could be displayed and possibly copied in accordance with the present invention. Beginning with FIG. 6, Item 650 shows a large area of values, representing shares of multiple securities, such multiple security totals represented in items 630, Total Founders Shares, 631, Total Series A Shares, 636, Total Series A Warrants, 632, Total Series B Shares, 639, Total Series B Warrants, 633, Total Series C Shares, 634, Total Series D Shares, and 635, Total Options Outstanding. The quantitative relationships between each of these rounds, along with the terms regarding those relationships and future relationships, are only partially represented by the capitalization table in FIG. 6. Still, simply copying and pasting those relationships for use for a new financing round is not available in the prior art. Furthermore, the more detailed, but essential for accurate use in a future proposed or actual round of financing or exit transaction, information regarding prior rounds, must be incorporated in proposed or actual financings or exit scenarios if parties are to accurately understand the implications of the new financing or exit on existing and future shareholders. The prior art provides no easy to use, easy to learn or easy to remember way to do this, much less a method and system to simply copy these complex relationships through a single interface. A very small excerpt of these complexities, as it might apply to a single part of a term for just one of the 8 securities in FIG. 6, for instance, is found in FIG. 11.

Referring again to FIG. 1, specifically item 1102, which shows an anti-dilution formula of the form NCP=OCP*((A+B)÷(A+C)). This formula can be, and in various documents is, represented by alternative variables that have an equivalent mathematical and financial meaning. Similarly, alternative formulas that approximate, but do not equal, the one in item 1102 can be presented. Under both of these circumstance, a user of the document, under the prior art, would have to create a spreadsheet or other model, with multiple complex formulas and assumptions simply to accurately understand the role and impact of the formula in 1102. Obviously, this task alone would be quite time consuming, and still not completely reflect the other terms of this single security, much less the terms for all of the other securities. FIG. 12 is a user interface that presents the share weightings, in both a formulaic manner in 1201 and in a more graphic representation with each security type and its applicable shares included in the weighting represented in various graphical presentations in 1230. Using the present invention, the high-level anti-dilution formula for a given security, such as the weighted average broad formula shown in 1102 of FIG. 11 and represented in a more quantitative and graphical manner in FIG. 12, can be copied in a global manner that reflects all of these complexities, and preserves them for future, further editing in a new security, but does so using a very simple interface.

Figure 7:
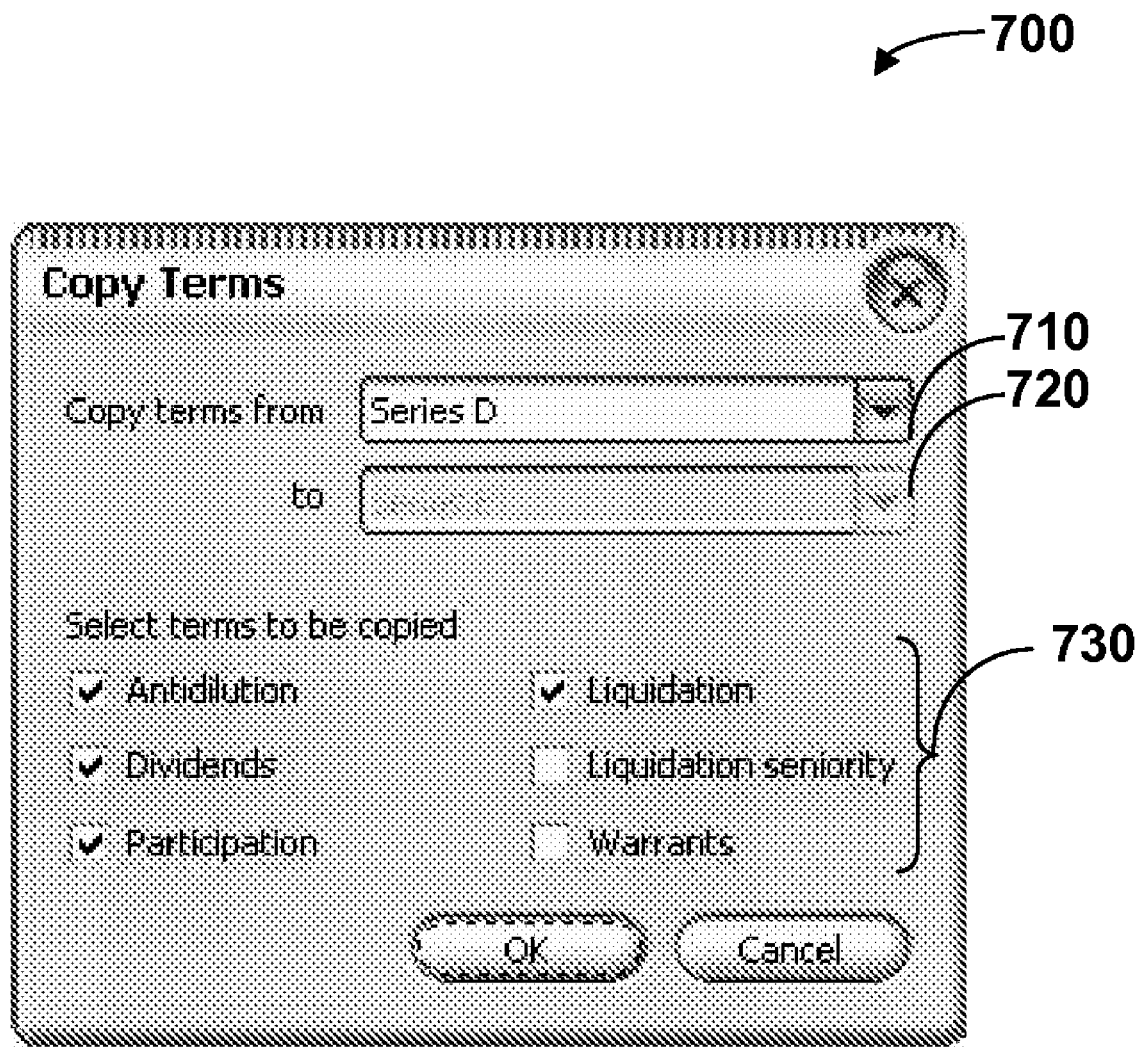
FIG. 7 is an illustration of a sample interface for copying equity security terms, aggregately or selectively, in accordance with the present invention

Referring again to FIG. 5, the method and system of copying equity financing terms in accordance with the present invention, and specifically item 530, presentation of a summary version of those terms 530, enabling the user to quickly copy categories of terms, as opposed to having to manually select or specify each nuance of each and every term primer to building an accurate model or actual financial or liquidation transaction which would be the case in the prior art for a single term, much less multiple terms. FIG. 7 presents a sample of an interface that would allow the user to quickly copy categories of terms in accordance with the present invention. Item 710 of FIG. 7 shows a dropdown list containing existing securities from which categories of terms, along with the detailed specifics supporting implementation of those terms, can be selected for application to a new security or round of financing, such new round or security indicated in 720 of FIG. 7. Based on the nomenclature or naming conventions be used in the prior securities 710, the system can automatically suggest the subsequent name for the new actual or proposed round to populate in 720. So, for instance, if the prior securities took the form of Series A, Series B, Series C and Series D, the new round suggested name in accordance with the present invention could be Series E in 720, for instance.

Item 730 of FIG. 7 illustrates a presentation of the term categories in accordance with the present invention, listing sample categories here such as Antidilution, Dividends, Participation, Liquidation, Liquidation seniority and Warrants. You will note that in the example found in 730 of FIG. 7, all items except Liquidation seniority and Warrants are selected by default. This reflects, in part, the ability of the system not only to copy the terms in categories and in detail, as opposed to the prior art which does not have this ability; but also this reflects an early stage of how the system and method copies relative terms and exact terms as appropriate given context and rules, as noted in 540 of FIG. 5. Liquidation seniority, also called rank or other terms that refer to a security's relative order in the line of payment under a liquidity event of a certain type, is generally not the same as the prior series, although it may be in certain circumstances. As a result, the system defaults to the more likely case that the new security has a higher, superior, rank or seniority over all prior securities, even if the other terms for that prior security are being copied. More importantly, if the user does select (check) the Liquidation seniority item in 730 of FIG. 7 for instance, the present invention will not simply copy the liquidation seniority of the round being copied exactly, but will make the new security "pari passu" or equal in its liquidation rights with the series from which the terms are being copied. This is a small example of the ability to copy both exact and relative terms and apply them across a model, using a single interface.

Another example of how the system and method copies relative terms and exact terms as appropriate given context and rules, as noted in 540 of FIG. 5, can be illustrated by the other unchecked item in 730 of FIG. 7, Warrants. Warrants are, perhaps, one of the most complex of all securities that have to be taken into account when modeling a new financing transaction or an exit, IPO or other liquidity event. As a result, the prior art will often avoid enabling even modeling these securities, much less copying them on a relative basis. To illustrate how a relative basis copy versus an exact copy would look like for warrants, assume that the prior series, Series D in the running illustration, had warrants of 100,000, with Series D shares as the underlying security, an expiration date of Jan. 31, 2010, an early expiration trigger of an IPO or merger, provided for a cashless exercise but did not include the multiple liquidation preferences of the underlying security. An exact copy of these terms would result in the new security or series, Series E for instance, having 100,000, with Series D shares as the underlying security, an expiration date of Jan. 31, 2010, an early expiration trigger of an IPO or merger, provided for a cashless exercise but did not include the multiple liquidation preferences of the underlying security. This, of course, likely would not reflect the intention of a user, which would more likely have wanted to copy all of the terms, but as they would relate to a new series. As such, that copy would look to the percentage of all Series D shares originally issued that the 100,000 warrants represented, and, if warrants were issued in the Series E round, apply a comparable number of warrants based on that percentage. Similarly, a relative copy of the underlying security would mean that Series E, not Series D, was the underlying, that the expiration date of Jan. 31, 2010 was to the issue date of Series D as the expiration date for the Series E warrants were to the Series E issue date being modeled, and so forth. The advantage of this approach over the prior art is substantial, in an automated system, even in the absence of a simplified interface such as the one in FIG. 7 in accordance with the present invention.

Figure 8:
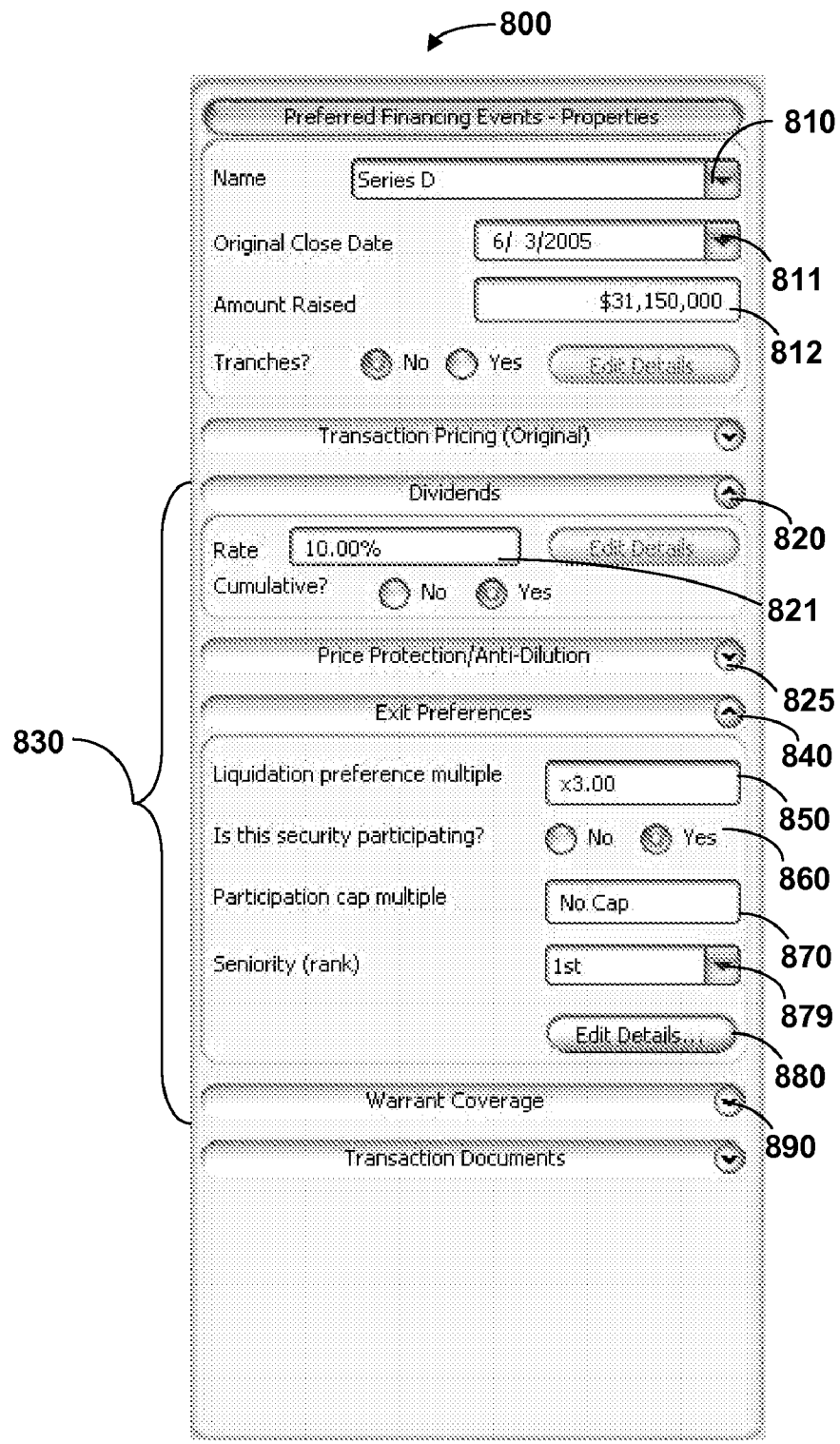
FIG. 8 is an illustration of a sample interface that displays security terms at a high level, quantitatively, such terms being used to illustrate terms that could be displayed and possibly copied in accordance with the present invention

Continuing with FIG. 7, one of the items that is selected (checked) in the illustration section 730 is the Liquidation item, which is to indicate Liquidation Preference terms, or exit preference terms, in the illustration. FIG. 8, which illustrates a sample interface that displays security terms at a high level, quantitatively, has included in it a more detailed breakdown of the general categories found in FIG. 7, along with related values and amount, along with basic information that identifies the security, such as the security name. For instance, in 810 of FIG. 8, we see the active security name, which is Series D in the illustration, informing the user that the terms that follow on this interface 800 are those belonging to Series D. Referring again to FIG. 7, it is noted that 710 also displays Series D, which means that the values displayed in interface 800 for Series D will be copied, exactly and relatively as appropriate, to the target new security Series E in 720 of FIG. 7.

Referring again to interface 800 of FIG. 8, specifically item 840, which is a collapsible control with the heading Exit Preferences. Within this collapsible control are a series of terms, at a relatively high-level of detail, including the liquidation preference multiple 850, if any, participation clause 860, if any, participation cap multiple 870, if application and Seniority or rank 879. Note that each of these items correspond to one of three of the categories in FIG. 7, those categories being Participation in 730, which corresponds to participation clause 860 and participation cap multiple 870, Liquidation in 730, which corresponds to items liquidation preference multiple 850 in FIG. 8 and Liquidation seniority in 730, which corresponds to Seniority (rank) 879 in FIG. 8. Just by viewing this small collection of complex factors makes it clear the value and utility of the present invention. However, when one considers the great deal of further details and intricate details behind these high level values the utility is overwhelmingly potent. Most users do not want to see the intricate level of detail and choices behind each transaction, security or liquidity event each time they model a transaction. However, if these details are not modeled, grave errors in decision making and assertions can occur. The present invention is able to use the same discerning approach to copying those important details exactly and relatively as has been demonstrated earlier with regard to the high-level values in 800.

Figure 9:
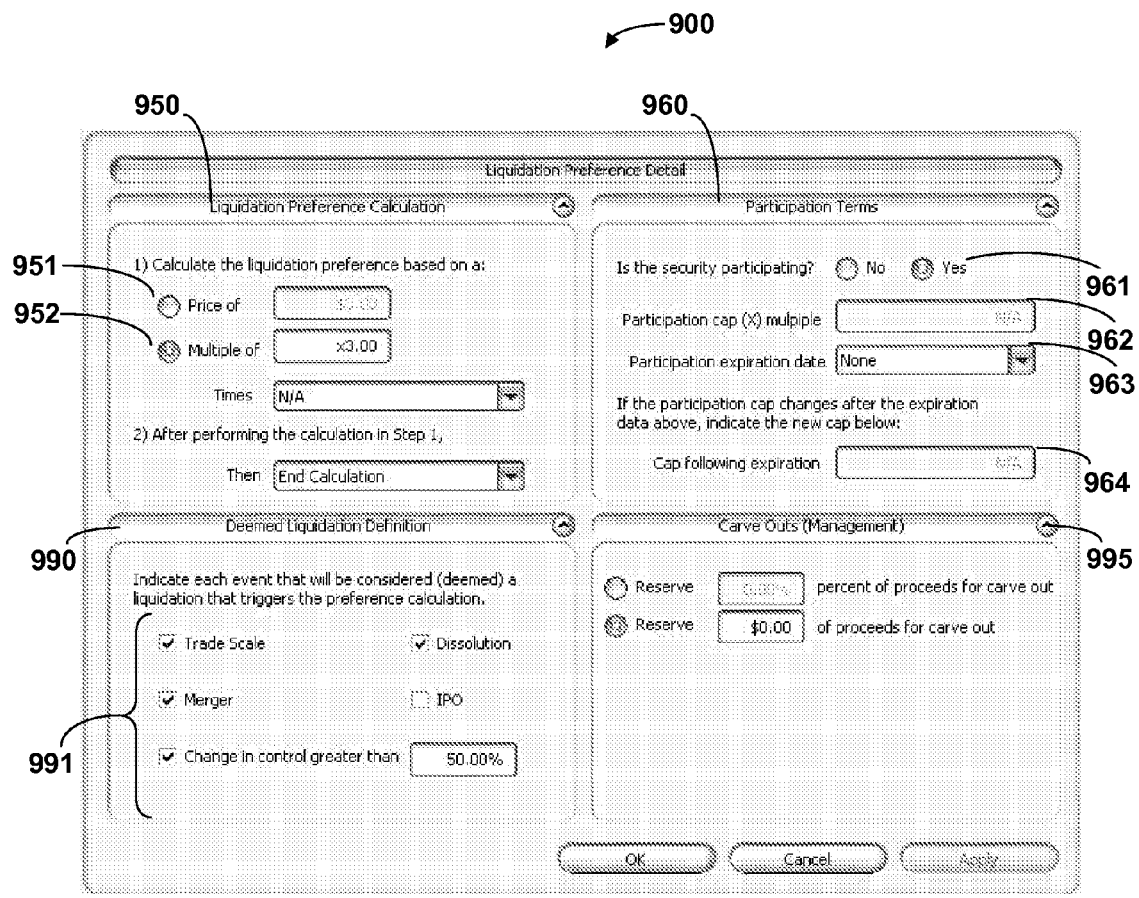
FIG. 9 is an illustration of a sample interface that displays one of the security term categories shown in FIG. 8, in this particular case liquidation and participation preferences, at a high level, quantitatively, but shown here in this interface at a more detail level, such detail terms being used to illustrate terms that could be displayed and possibly copied in accordance with the present invention

FIG. 9 is an illustration of a sample interface that displays one of the security term categories shown in FIG. 8, in this particular case the exit preferences 840, such as liquidation 850, and participation preferences 860 and 870, along with Liquidation seniority 879, at a high level, quantitatively, but shown here in this interface at a more detail level, such detail terms being used to illustrate terms that could be displayed and possibly copied in accordance with the present invention. In accordance with the present invention, a close observation of item 951, Price of and 952, Multiple of, in expandable category Liquidation Preference Calculation 950 in interface 900 of FIG. 9, reveals a gray subdued value of $3.00 in 951 along with a regular text value of ×3.00 in 952. An example the relative copying in this instance would be if the Price of 951, with a value of $3.00, was copied exactly to a series that had an original issue price per share of $3.00, such copying would result in an error at a 3×, or ×3.00, liquidation preference as shown in 952. If copied relatively, the proper display for the series that was copied to, under the scenario described, would instead be $9.00 per share. Also, at the detail level in collapsible category 990, Deemed Liquidation Definition, the items that are considered a liquidation, as opposed to another type of transaction generating proceeds or the possibility of generating proceeds, are defined. These items are common in the art, but never modeled in this manner, where a user can simply click to indicate which are liquidity events and then have the system model those items when they are indicated or when they occur in a report or scenario. This being the case, the possibility of copying these items on a relative or exact basis has not been contemplated as evidenced in the prior art. However, the importance of relative for some of the items, such as 50% change in control in 991, which would need to be relative to both time and the amount of the new series, resulting in a different number of shares to trigger the provision and be deemed a liquidation. On the other hand, a trade sale as a Deemed Liquidation would be copied exactly to the new series, all of this under the general categories of Participation, Liquidation, and if applicable, Liquidation seniority from 730 of FIG. 7. Similarly, the participation expiration date, 963 in 960 of interface 900, would be copied on a relative basis, if applicable.

Each of the formerly mentioned complex, but critical, calculations would be triggered through a single interface, such as 700 in FIG. 7, within a fraction of a second of a user's click. Thereafter, the new security would have its own complex, but accurate, terms and conditions that could be further edited if needed, as illustrated in the new security interface terms populating 1000 of FIG. 10. As illustrated, the dividends from 821 of FIG. 8, shown here at a high level, but also including the intricate detail calculations and terms in the background, are shown here for the new security at a high level in 1021 of FIG. 10. Similarly the anti-dilution provision in 1025, from 825 at the high-level, with detail copied in the background to 1026 of FIG. 10, the exit preferences 1050 including the exit preferences 1040, from 840, 1050, from liquidation 850, and participation preferences 860 and 870, at a high level, quantitatively to 1060 and 1070 respectively, and also copied at the detail level.

The invention claimed is:

1. A computer readable memory storing a computer program executable by a processor, for producing a user interface of an equity and debt financing terms display, copying and editing system for multiple classes of securities, the user interface comprising:
   a computer readable memory storing a computer program executable by a processor, for producing a user interface of an equity and debt financing terms display, copying and editing system for multiple classes of securities, the user interface comprising:
   a first computer display area, on a desktop computer, server computer, handheld computer or Smartphone computer, for listing a plurality of securities issued by a single company, from which terms can be selected to be copied to form the basis of prospective or actual future securities to be issued, such terms representing a plurality of quantitative calculations and relationships that have been reduced to a single word or collection of words for each term, that can be selected as part of the copy process or deselected as part of the copy process, at the option of the user;
   an executable process that populates possible securities from which terms are to copied from in the first display area and defaults to potential new securities to which terms selected by the user will be copied to.

2. The computer readable memory of claim 1, further comprising:
   a second computer display area, on a desktop computer, server computer, handheld computer or Smartphone computer, that displays security terms categories, at a high general level, but at a more detailed level than the term categories presented in a first display area, for each existing security for whom terms can copied from, when the user selects a desired security to view or copy from;
   an executable process that enables a limited amount of high level terms to be displayed in greater detail at a single time, upon selection by a user, and simultaneously reduces the detail displayed for other terms to increase ease of editing and viewing by the user.

3. The computer readable memory of claim 2, further comprising:
   a third display area, visually distinguished from and concurrently displayed with the second display area, at the users option, for listing a plurality of financing and liquidation scenarios with controls to allow a user to increase or decrease the pricing variables of the new security to see the impact, instantly, on existing securities;
   an executable process that applies a single special color to new share and pricing amounts related to the new security presented in the third display area.

4. The computer readable memory of claim 2, further comprising:
   an executable process that determines the constraints of possible terms for existing securities, based on an exemplary spreadsheet application display, containing a capitalization table with multiple classes of equity securities.

* * * * *